(12) United States Patent
Wajs et al.

(10) Patent No.: US 9,787,479 B2
(45) Date of Patent: Oct. 10, 2017

(54) CHALLENGE-RESPONSE METHOD AND ASSOCIATED CLIENT DEVICE

(71) Applicant: IRDETO B.V., Hoofddorp (NL)

(72) Inventors: Andrew Augustine Wajs, Hoofddorp (NL); Calin Ciordas, Hoofddorp (NL); Fan Zhang, Beijing (CN)

(73) Assignee: IRDETO B.V., Hoofddorp (NL)

( * ) Notice: Subject to any disclaimer, the term of this patent is extended or adjusted under 35 U.S.C. 154(b) by 33 days.

(21) Appl. No.: 14/778,860

(22) PCT Filed: Mar. 27, 2013

(86) PCT No.: PCT/CN2013/073241
§ 371 (c)(1),
(2) Date: Sep. 21, 2015

(87) PCT Pub. No.: WO2014/153728
PCT Pub. Date: Oct. 2, 2014

(65) Prior Publication Data
US 2016/0043872 A1    Feb. 11, 2016

(51) Int. Cl.
*H04L 9/32*    (2006.01)
*H04L 9/08*    (2006.01)

(52) U.S. Cl.
CPC .......... *H04L 9/3271* (2013.01); *H04L 9/0816* (2013.01); *H04L 2209/24* (2013.01); *H04L 2209/60* (2013.01); *H04L 2209/603* (2013.01)

(58) Field of Classification Search
CPC . H04L 9/3271; H04L 9/0816; H04L 2209/24; H04L 2209/60; H04L 2209/603
See application file for complete search history.

(56) References Cited

U.S. PATENT DOCUMENTS 6,301,660 B1 * 10/2001 Benson .................. G06F 21/10
                                                            380/280
7,111,167 B1    9/2006 Yeung et al.
(Continued)

FOREIGN PATENT DOCUMENTS

CN       1170995 A      1/1998
CN     101374085 A      2/2009
(Continued)

OTHER PUBLICATIONS

Cheung et al., A Commutative Encrypted Protocol for the Privacy Protection of Watermarks in Digital Contents, Jan. 2004, Proceedings of the 37th Annual Hawaii International Conference on System Sciences, pp. 1-10.*

(Continued)

*Primary Examiner* — Kenneth Chang
(74) *Attorney, Agent, or Firm* — Rimon, PC; Mark S. Kaufman

(57) ABSTRACT

There is described a challenge-response method for a client device. The method comprises steps of: (a) receiving challenge data, wherein the challenge data is content encrypted using an encryption key, the content including a nonce; (b) using a secured module of the client device to access the content by decrypting the challenge data using a decryption key of the secured module, the decryption key corresponding to the encryption key; (c) processing a version of the content output by the secured module so as to obtain the nonce; and (d) providing the nonce as a response. There is also described a client device for implementing the above challenge-response method. There is also described a computer program which, when executed by a processor, causes the processor to carry out the above challenge-response method. Finally, there is described a computer readable medium storing the above-mentioned computer program.

9 Claims, 2 Drawing Sheets

(56) References Cited

U.S. PATENT DOCUMENTS

| | | | |
|---|---|---|---|
| 2002/0152393 A1* | 10/2002 | Thoma | H04L 63/0435 713/189 |
| 2003/0133576 A1* | 7/2003 | Grumiaux | H04L 9/0866 380/279 |
| 2004/0054678 A1* | 3/2004 | Okamoto | G06Q 30/02 |
| 2004/0165728 A1* | 8/2004 | Crane | G06F 21/62 380/279 |
| 2004/0249905 A1* | 12/2004 | Wilcock | G06Q 30/02 709/217 |
| 2005/0074125 A1* | 4/2005 | Chavanne | G06F 21/10 380/278 |
| 2009/0037740 A1* | 2/2009 | Moskowitz | H04N 21/23892 713/176 |

FOREIGN PATENT DOCUMENTS

| | | |
|---|---|---|
| EP | 2506174 A1 | 10/2012 |
| EP | 2506175 A1 | 10/2012 |
| WO | 0195074 A2 | 12/2001 |
| WO | 2012126077 A1 | 9/2012 |
| WO | 2012129639 A2 | 10/2012 |

OTHER PUBLICATIONS

Extended European Search Report cited in corresponding European Application No. 13880463.8 dated Oct. 26, 2016.

Dries Schellekens et al: "Embedded Trusted Computing with Authenticated Non-volatile Memory", Mar. 11, 2008 (Mar. 11, 2008), Trusted Computing—Challenges and Applications; [Lecture Notes in Computer Science], Springer Berlin Heidelberg, Berlin, Heidelberg, pp. 60-74.

Diaz-Sanchez D et al: "Extended DLNA protocol: Sharing protected pay TV contents", 2010 Digest of Technical Papers / International Conference on Consumer Electronics (ICCE 2010) : Las Vegas, Nevada, USA, Jan. 9-13, 2010 / [IEEE Consumer Electronics Society], IEEE, Piscataway, NJ, USA, Jan. 9, 2010 (Jan. 9, 2010), pp. 321-322.

International Search Report and Written Opinion cited in corresponding International Application No. PCT/CN2013/073241 dated Dec. 16, 2013.

\* cited by examiner

CHALLENGE-RESPONSE METHOD AND ASSOCIATED CLIENT DEVICE

The present application is the United States national stage of International Application No. PCT/CN2013/073241, filed Mar. 27, 2013, the entire content of which is incorporated herein by reference.

FIELD OF THE INVENTION

The present invention relates to a challenge-response method for a client device, and a client device for implementing a challenge-response method. The challenge-response method of the present invention may be used in node locking (i.e. hardware anchoring) applications for client devices.

BACKGROUND OF THE INVENTION

Application software, also known as an application or an app, is computer software designed to help the user to perform specific tasks. Examples include enterprise software, accounting software, office suites, graphics software and media players. In recent years, the abbreviation "app" has specifically come to mean application software written for mobile devices. Application software applies the power of a particular computing platform or system software to a particular purpose. In other words, applications make use of the operation system of a computing device to gain access to the hardware resources. Applications also require access to a graphics environment for interaction with the end user. These software applications (often called native applications) use a hardware execution engine such as a Central Processing Unit (CPU). An application's dependency upon existing resources in a specific computing device means that the software provider may need to provide different versions of the application for execution on different device platforms. A virtual machine execution model enables a software provider to distribute a single application for execution on multiple different device platforms. Scripting languages in combination with a graphics environment are an alternative for a virtual machine execution model, providing similar multi-platform benefits. This approach has been adopted for web applications and in the HTML-5 W3C recommendation.

Many applications require the software to be limited to a single end user computing device (or client device). This can be achieved by making the execution of the software application dependent on a hardware function that is specific to a single end user device.

So-called "node locking" (or "hardware anchoring") technologies provide a software application with a hardware dependent function for integration into its execution path (see, for example EP2506174 and EP2506175). This provides a mechanism to lock the execution of the application to a specific end user device. The node locking function also enables an application to generate a message demonstrating that the application is operating on a particular end user device. This can be used for authentication purposes. These node locking applications describe a challenge-response function that is specific for a particular hardware circuit. A challenge-response methodology generally relies on a secret in a hardware device. Knowledge of the secret enables the generation of challenge-response pairs which enable an application to verify that the application is executing on the intended platform. EP2506174 and EP2506175, as referenced above, describe systems and methods for using a node locking function (a challenge-response function) in combination with secured software applications.

Node locking technologies for software applications require the availability of a function that is specific to a particular end user device. EP2506175 achieves this by leveraging a specific function of a standard Subscriber Identity Module (SIM), e.g. in a mobile telephone. As the Operating System generally does not expose the SIM functionality to applications executing on the device, the SIM locking mechanism of EP2506175 requires modifications to the Operating System of the device. Thus, this challenge-response solution is undesirable in some circumstances. EP2506174 requires specific hardware features in a device, which makes this challenge-response solution unsuitable for use with an existing device infrastructure.

Even if node locking techniques are available to local applications, web based applications (e.g. based on HTML5) that operate in a browser, do not have access to such node locking facilities since the browser Application Programming Interface (API) does not expose such functions to the web applications.

There is a need for a node locking (challenge-response) function for existing devices that is accessible to applications, virtual machine applications, and web applications (scripted applications). The present invention seeks to provide a challenge-response technique which overcomes some of the problems with existing solutions.

SUMMARY OF THE INVENTION

According to a first aspect of the present invention, there is provided a challenge-response method for a client device. The method comprises steps of: (a) receiving challenge data, wherein the challenge data is content encrypted using an encryption key, the content including a nonce; (b) using a secured module of the client device to access the content by decrypting the challenge data using a decryption key of the secured module, the decryption key corresponding to the encryption key; (c) processing a version of the content output by the secured module so as to obtain the nonce; and (d) providing the nonce as a response.

Optionally, the version of the content processed in the processing step may be an unmodified version of the content. Alternatively, the version of the content processed in the processing step may be a modified version of the content.

In one embodiment, the content is audio content. In this case, the version of the content output by the secured module is an audible version of the content provided via a speaker of the client device; prior to the processing step, the method further comprises a step of receiving the audible version of the content using a microphone of the client device; and the processing step comprises processing the audible version of the content received by the microphone so as to obtain the nonce.

Advantageously, the nonce may be encoded with an error correcting code, and the processing step further comprises decoding the error correction encoded nonce.

Optionally, the nonce may be included in the content as a digital watermark. Alternatively, the nonce may be included in the content using a modulation encoding technique.

In one embodiment, the decryption key is unique to the secured module.

According to a second aspect of the present invention, there is provided a client device for implementing a challenge-response method. The client device comprises an input module, a secured module, a processor, and an output module. The input module is for receiving challenge data.

The challenge data is content encrypted using an encryption key. The content includes a nonce. The secured module is arranged to access the content by decrypting the challenge data using a decryption key of the secured module. The decryption key corresponds to the encryption key. The processor is arranged to process a version of the content output by the secured module so as to obtain the nonce. The output module is arranged to provide the nonce as a response.

In one embodiment, the content is audio content. In this case, the client device further comprises a speaker and a microphone. The speaker is arranged to provide an audible version of the content output by the secured module. The microphone is arranged to receive the audible version of the content. The processor is arranged to process the audible version of the content received by the microphone so as to obtain the nonce.

Advantageously, the nonce is encoded with an error correcting code, and the processor comprises an error correction module arranged to decode the error correction encoded nonce.

Optionally, the input module forms part of the secured module such that the secured module is itself operable to receive the challenge data.

According to a third aspect of the present invention, there is provided a computer program which, when executed by a processor, causes the processor to carry out a method according to the first aspect.

According to a fourth aspect of the present invention, there is provided a computer readable medium storing a computer program according to the third aspect.

Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

Figure 1:
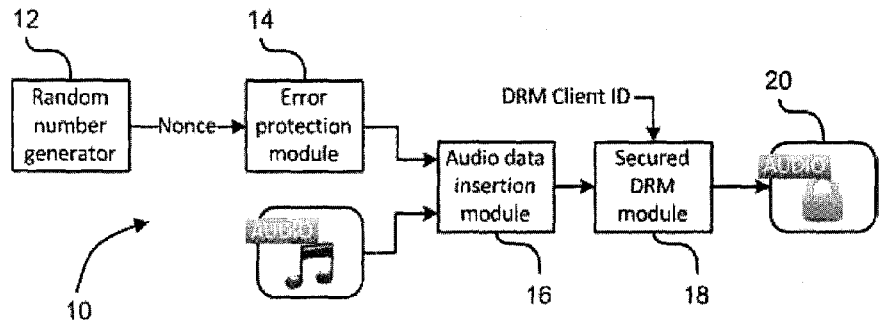
FIG. 1 schematically illustrates a system for generating DRM protected audio content to form a challenge in the challenge-response method of the present invention.

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Digital Rights Management (DRM) technologies are well known for controlling access to protected content files. A protected content file comprises an encrypted content part and a usage rules part. The client DRM system first processes the usage rules to generate a content decryption key that is used to decrypt the content part. Note that the usage rules part typically includes encrypted elements. The DRM implementation in the end user device is implemented in a tamper resistant way, in order to defend against attacks against the implementation.

DRM Systems are generally used by movie and music rights holders in order to protect their video and audio content against unauthorised distribution. There are wide ranges of DRM systems that have been integrated for use in different end user devices (such as tablets, music players, mobile phones, game consoles, and even PCs). These DRM systems are typically implemented in a tamper resistant manner, making it difficult for an attacker to obtain the sensitive information needed to strip the DRM protection or to emulate the DRM client implementation.

Many end user devices (especially mobile smart phones) use Android as an operating system. This open source operating system allows easy modifications by end users, which could potentially lead to significant problems with unauthorised distribution of content. The deployment of embedded hardware DRM implementations enables content distribution to such platforms whilst at the same time protecting against unauthorised distribution. For example, the Galaxy S3 mobile smart phone contains a hardware-assisted and very robust implementation of a DRM client. The implementation details of the DRM client, such as the hardware circuits used, the robustness criteria and the secure storage for keys, are proprietary to the various hardware providers and/or the DRM system providers.

The present invention relates to a DRM implementation of a challenge-response node locking function in a client device (i.e. an end user device). The "challenge" is DRM protected content which includes a nonce. A client device is able to use its own DRM system to extract the nonce from the challenge so as to provide the nonce as a response. The challenge data could be any content encrypted using an encryption key, the content including a nonce. However, in the embodiment described below with reference to FIGS. 1 and 2, the challenge data is DRM protected audio content (e.g. a DRM protected audio file, or streamed DRM protected audio content).

Audio Content Example

The generation of the DRM protected audio content is shown schematically in FIG. 1. The system 10 of FIG. 1 includes a random number generator 12, an error protection module 14, an audio data insertion module 16 and a secured DRM module 18.

The random number generator 12 (which may be a pseudo-random number generator) is operable (or arranged) to generate a nonce. It should be noted that, for some applications, the nonce may contain non-random information.

The error protection module 14 is operable to encode the nonce with an error correcting code (ECC) in order to protect against data distortions in the nonce recovery process. In other words, the error protection module 14 is used to add redundancy to the nonce such that the nonce may be recovered by the client device even in cases of incomplete data transmission, for example. Whilst it is advantageous to add error protection to the nonce, it is not essential. Thus, the error protection module 14 is an optional element of the system.

Audio content (e.g. an audio file) and the ECC protected nonce are provided as inputs to the audio data insertion module 16. (Of course, it will be understood that if the error protection module 14 is omitted, then the nonce itself is provided as an input to the audio data insertion module 16, rather than inputting the ECC protected nonce.) The audio data insertion module 16 is operable to insert the ECC protected nonce into the audio content. There are a number of ways in which the ECC protected nonce may be embedded into the audio content. In one embodiment, the ECC protected nonce may be added as an audio watermark to the audio content (NB a video watermark could be used for video content). Alternatively, the ECC protected nonce is included in the content using a modulation encoding technique. For example, the ECC protected nonce may be encoded/embedded using audio frequency-shift keying (AFSK) or similar modulation encoding formats. Embedding the ECC protected nonce as an audio watermark produces a more pleasant audio output than embedding using AFSK or the like, but may need a longer audio fragment to embed the ECC protected nonce. The output of the audio data insertion module 16 is plaintext/cleartext (i.e. non-encrypted) audio content (i.e. a plaintext audio file).

The secured DRM module 18 is operable to generate a DRM protected version of the audio content for a particular client device having a particular "DRM client ID". In fact, the "DRM client ID" is associated with a secured DRM module of the particular client device. The secured DRM module 18 of FIG. 1 is operable to process the plaintext audio content using the DRM client ID so as to generate a DRM protected version of the audio content that is suitable for playback on the identified client device. The secured DRM module 18 achieves this using encryption based on one or more encryption keys for the identified client device (i.e. keys associated with the secured DRM module of the client device). The encryption keys and encryption algorithms are known to the DRM system only. For example, the encryption keys may be known only to the secured DRM module 18, and the corresponding decryption keys may be known only to the secured DRM module of the particular client device. It will be understood that there are many cryptographic techniques suitable for use in such a DRM system, and these will not be further described here. The DRM protected audio content 20 is output by the secured DRM module 18.

Figure 2:
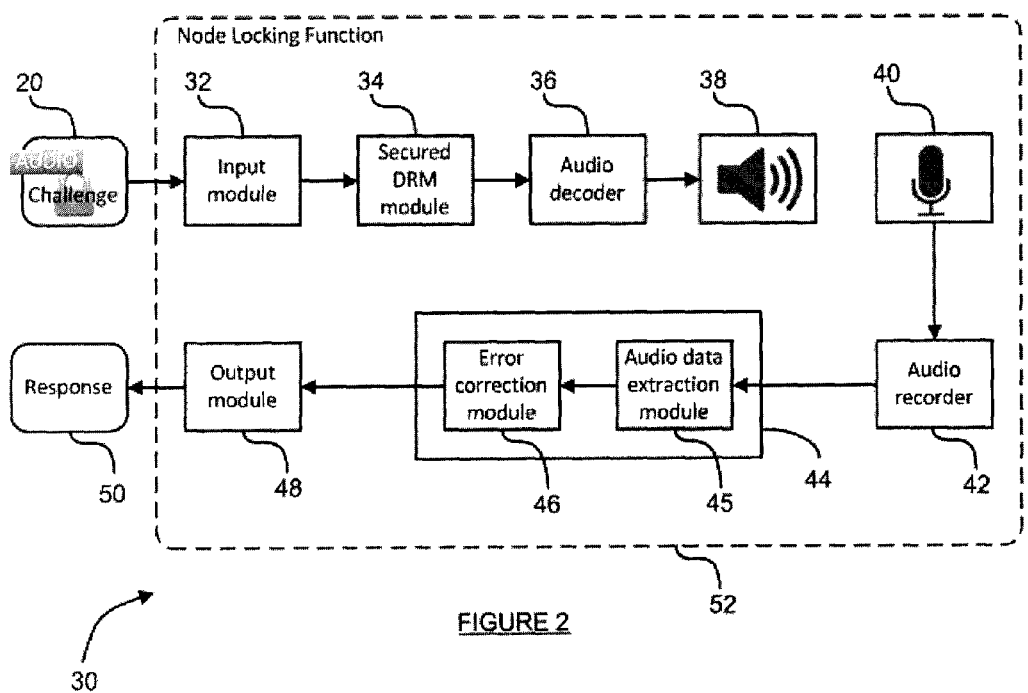
FIG. 2 schematically illustrates a client device for implementing the challenge-response method of the present invention.

FIG. 2 schematically illustrates a client device 30 for implementing the present challenge-response methodology. The client device 30 may be a mobile phone or a tablet computer, for example. The client device 30 includes an input module 32, a secured DRM module 34, an audio decoder 36, a speaker 38, a microphone 40, an audio recorder 42, a processor 44, and an output module 48. Together, these elements of the client device 30 perform the node locking function (schematically shown by the dashed line 52 in FIG. 2). Clearly, the client device may include other modules/elements relating to other functionality of the client device 30. Some modules/elements (including some of those shown in FIG. 2) may be shared by multiple functional blocks of the client device 30. Therefore, FIG. 2 is only a schematic depiction of some elements of the client device 30.

The DRM protected audio content 20 output by the secured DRM module 18 of FIG. 1 forms the "challenge" (or challenge data) in the present challenge-response methodology. The input module 32 is operable to receive the challenge data 20 and to pass it to the secured DRM module 34 of the client device 30. For example, the input module 32 may send the challenge data with a rendering request to the secured DRM module 34. A secured DRM module API (not shown) may be used to activate the secured DRM module 34. The input module 32 may be separate from the secured DRM module 34 (as shown schematically in FIG. 2), or may form part of the secured DRM module 34 such that the secured DRM module 34 itself receives the challenge data 20.

The secured DRM module 34 is operable to decrypt the challenge data 20 using a decryption key of the secured DRM module 34. Specifically, the secured DRM module parses the DRM encoded usage rules associated with the DRM protected audio content 20, and then decrypts the DRM protected audio content 20 in accordance with these rules. In one embodiment, the decryption key is a private key of the secured DRM module 34 and the encryption key is a public key of the secured DRM module 34. Alternatively, the decryption key is the same as the encryption key, the encryption key being a symmetric secret key shared by both the secured DRM module 34 of the client device and the secured DRM module 18 used to encrypt the audio content to form the challenge data 20.

The decrypted audio content is transferred to the audio decoder 36 using a secured data channel. The use of a secured data channel is advantageous since it prevents other applications from accessing the decrypted audio content. Whilst the use of a secured data channel is used in virtually all DRM client implementations, it is not essential, as will be described later with reference to an alternative embodiment.

In the embodiment of FIG. 2, the audio decoder 36 produces an audible output using the speaker 38 of the client device 30. Thus, the secured DRM module effectively outputs an audible version of the audio content by means of the audio decoder 36 and the speaker 38.

The microphone 40 of the client device 30 is operable to receive the audible version of the audio content output by the speaker 38. The audio recorder 42 is operable to record the sound captured by the microphone 40 so as to provide a recording of the audio content. Such a recording of the audio content will be imperfect such that the recording is a modified version of the original audio content (as output by the audio decoder 36 and the speaker 38). For example, the quality of the speaker 38 and the microphone 40 will affect the recording (particularly in certain frequency bands). The recording will also capture environmental noise. Thus, the audible version of the audio content received by the microphone 40 (and recorded by the audio recorder 42) will generally be slightly different from the audible version of the audio content output by the speaker 38.

The processor 44 is operable to process the recording to obtain the nonce. The processor includes an audio data extraction module 45 and an error correction module 46. The audio data extraction module 45 is operable to access the recording of the audio content made by the audio recorder 42. The audio data extraction module 45 is further operable to recover the ECC protected nonce from the recording using signal processing techniques. In other words, the audio data extraction module 45 is operable to use signal processing techniques to extract the nonce from the version of the audio content received by the microphone 40. The signal processing techniques used by the audio data extraction module 45 will depend on the way in which the nonce has been included in the audio content (e.g. as an audio watermark or using a modulation encoding technique). Such techniques will be familiar to a person skilled in the art.

Thus, the embodiment of the invention shown in FIG. 2 is one example of an embodiment in which the decrypted content is obtained by capturing an analogue output (i.e. by recording the playback of an audio file) and processing the captured analogue output of the content to extract an embedded data signal.

Having extracted the ECC protected nonce from the audio content, the audio data extraction module 45 passes the ECC protected nonce to the error correction module 46. The error correction module 46 is operable to decode the ECC protected nonce to provide the original nonce. Like the error protection module 14, the error correction module 46 is an optional element of the system. It is not required if the nonce does not have added redundancy for error protection purposes.

The output module 48 is operable to receive the nonce from the error correction module 46 of the processor 44 and to provide the nonce as an output of the node locking function 52. Hence, the nonce may be considered as the "response" in the present challenge-response methodology.

Thus, the DRM protected audio content 20 is used in the client device 30 as a challenge input to a node locking function 52 in order to obtain a response 50. The response 50 should be equal to the nonce (see above) and will only be obtainable by the particular client device 30 containing the particular secured DRM module 34 having the relevant decryption keys. Often the decryption key used will be unique to (i.e. known only to) the particular secured DRM module 34 such that all other client secured DRM modules are unable to decrypt the challenge data 20. In other cases, it is envisaged that the decryption key used will be unique to (i.e. known only to) a group of client secured DRM modules such that only secured DRM modules in the group are able to decrypt the challenge data 20 and secured DRM modules not in the group are unable to decrypt the challenge data 20.

ALTERNATIVE EMBODIMENTS

As mentioned briefly above, the use of a secured data channel between the secured DRM module 34 and the audio decoder 36 is not essential. In the absence of the secured data channel, the node locking function 52 is able to directly intercept the decrypted data. This simplifies the system and removes the need to use the speaker 38, the microphone 40, and the audio recorder 42. In particular, the output from the secured DRM module 34 and the audio decoder 36 may be directly accessed by the audio data extraction module 45 of the processor 44. Thus, in this embodiment, the version of the audio content received by the processor 44 will be an unmodified version of the audio content (i.e. not affected by environmental noise, etc.).

The above alternative embodiment (which does not require the use of a secured data channel between the secured DRM module 34 and the audio decoder 36) may be generalised for non-audio content applications. In this case, the output of the secured DRM module 34 (whether audio or not) is observable by a non-privileged application (i.e. an application outside the DRM trusted zone of applications). An example is a secured DRM module 34 in the client device 30 that can be configured to allow third party access to the output of the secured DRM module 34. Another example could be DRM protected applications that can send a message (using a communication channel or a shared data file) to another non-privileged application.

Implementation in Software Applications

The present DRM-based challenge-response methodology may be used for node locking in software applications. In particular, the methodology described above with respect to FIGS. 1 and 2 provides a node-locking technique for software applications that plays a short DRM protected audio fragment (i.e. the challenge) containing an identifying data pattern (or nonce), records the rendered audio, processes the recorded audio content stream to extract the identifying pattern (i.e. the response), and uses it in further calculations. As the DRM protected file is configured for a specific end-user device, the audio file cannot be played on other end-user devices. The hardware based implementation of the DRM client thus links the identifying pattern (or nonce) to the specific end-user device. This node-locking function is available to native applications. The increasing support for audio input in web browsers (e.g. the Android 3.0 browser) and the widely available browser support for playback of (DRM protected) audio files, enable the invention to provide node-locking functions for web applications.

For example, a software application (e.g. a web application or a native application) may contain some personalization data which includes the DRM protected audio content that is targeted for a specific end-user device 30. As mentioned above, the DRM protected audio content can be seen as a challenge 20. The application presents this challenge 20 to a DRM-protected audio playback module (i.e. the node locking function of FIG. 2) and obtains the corresponding response 50 from the signal processing of the recording of the rendered audio content, as described above. The application may have several challenges 20 stored in the personalization data so as to avoid replay attacks. A reply attack involves successfully executing the personalized application on an end-user device other than the intended end user device 30 (i.e. other than the device for which the application has been personalized). This is done by recording the audio output from the speaker 38 of the intended device 30, and using this previously recorded audio signal to provide a valid response in another end user device. Preventing replay attacks may also be achieved by setting appropriate usage rules for the DRM protected audio content (e.g. play once).

Implementation for Authentication

Figure 3:
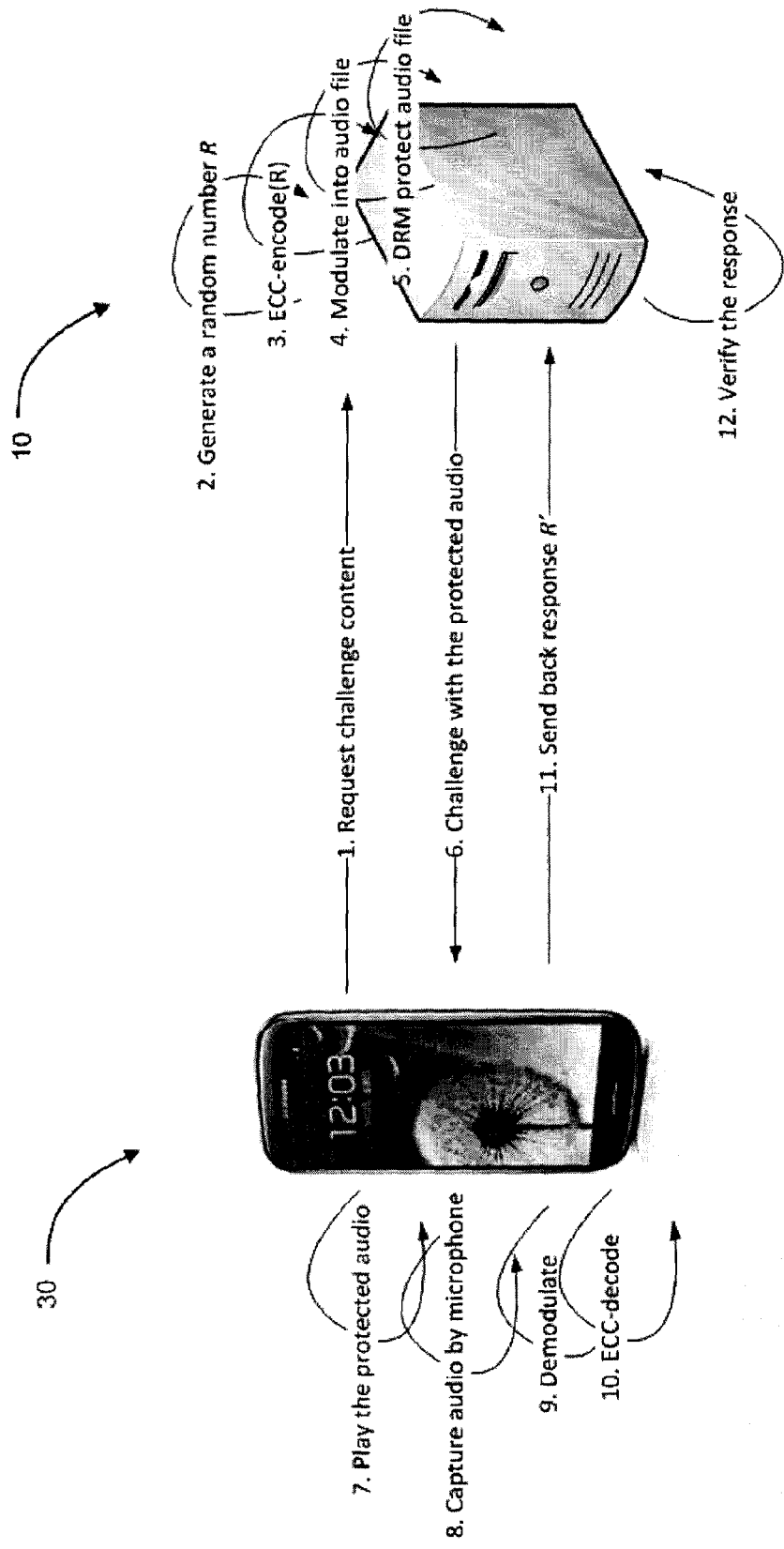
FIG. 3 schematically illustrates a client device authentication method using the challenge-response method of the present invention.

The present DRM-based challenge-response methodology may be used for authentication of client devices in software applications such as web applications. In this case, the web application executing on a client device 30 receives the challenge 20 (i.e. the DRM protected audio content) from a remote web server 10, which is used to generate the challenge 20. This authentication implementation is schematically illustrated by means of sequential steps 1 to 12 in FIG. 3. The client device 30 shown in FIG. 3 is a mobile phone.

In step 1, the application (executing on the mobile phone 30) sends a request for a challenge. This request includes the DRM identity of the mobile phone (i.e. the request includes DRM client ID of the secured DRM module 34 of the mobile phone). In step 2, the server 10 generates a (random) number (i.e. a nonce) using a random number generator 12. In step 3, the server 10 optionally adds error protection to the nonce using an error protection module 14. In step 4, an audio data insertion module 16 of the server 10 embeds the (error-protected) nonce into some audio content. As previously described, this may be done using AFSK modulation or audio watermarking, for example. Next, in step 5, a secured DRM module 18 of the server 10 DRM protects the audio content. Alternatively, the server 10 may request an external DRM server system to DRM protect the generated audio content. The DRM protected audio content forms the challenge 20.

In step 6, the server 10 sends the challenge to the web application executing on the mobile phone 30, as requested in step 1. In step 7, the application receives and decrypts the challenge (using the input module 32 and the secured DRM module 34 respectively) before playing the DRM protected audio content using the audio decoder 36 and the speaker 38 of the mobile phone 30. In step 8, the mobile phone uses a microphone 40 to record the sound during playback. Then, in step 9, the recording is demodulated using an audio data extraction module 45 in the processor 44 of the mobile phone 30 so as to obtain the ECC protected nonce. In step 10 (optional), an error correction module 46 in the processor 44 of the mobile phone 30 is used to obtain the nonce from the ECC protected nonce. Thus, the processor 44 is used in steps 9 and 10 to signal process the recording to obtain the nonce. The nonce is output by the output module 48 as a response (50, R'). In step 11, the response is returned sent to the server 10 to demonstrate that the application is executing on the intended platform 30. This approach can be used for authentication.

The response may be used by the client device in the execution of the application. For example, the response may be used within the application to at least partially enable the continued execution of the application on the end user device 30.

Applications of the Invention

Various application areas are envisaged for the present challenge-response methodology, e.g. mobile banking, web applications, secured software applications, etc.

The described challenge-response methodology aims to prevent the execution of copies of secured applications on another client device (i.e. a client device other than that for which the secured application is intended). This present methodology achieves this for a fairly broad range of existing devices and for a broad range of applications (native code, virtual machine code, scripts, web applications, etc.).

One application of the present methodology concerns "multi-factor authentication". Normally, multi-factor authentication requires that a user (i.e. a particular client device) has multiple methods of validating themselves to a server. An example of this is the RSA SecurID authentication mechanism that makes use of a "token"—either hardware (e.g. a USB dongle) or software (a soft token)—which is assigned to a computer user and which generates an authentication code at fixed intervals (usually 60 seconds) using a built-in clock and the card's factory-encoded random key (known as the "seed"). The seed is different for each token, and is loaded into the corresponding RSA SecurID server as the tokens are purchased. When using the RSA SecurID authentication mechanism, a user generally requires both a password and the authentication code generated by the token in order to log into a website, for example. The authentication code provides the server with proof that the user is in possession of the RSA token. However, using the present methodology, the secured DRM module 34 in the client device 30 may be used to replace the RSA token as the physical factor of authentication.

Another application of the present methodology concerns authentication of a client device by software running on the device, as described above. In particular, a software application can check if it is running on a device for which it is authorised to run by executing the steps outlined above. This could be used for several applications including software copy protection or protection of sensitive data or software. In one example where a software application is handling sensitive data, the entire program and data may be stored in an encrypted form. Then, on start up, the application can execute the present challenge-response methodology, and if the correct response is returned then the rest of the software can be unlocked. In another example where software is being copy protected, the software can perform the present challenge-response methodology, and then the software may only continue to execute if the appropriate response is returned. This enables the software to verify that it is executing on the allowed device.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks (e.g. the input module 32 and the secured module 34) are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A challenge-response method for a client device, the method implemented by one or more processors, the method comprising steps of:
   receiving challenge data, wherein the challenge data is audio content encrypted using an encryption key, the audio content including a nonce;
   using a secured module of the client device to access the audio content by decrypting the challenge data using a decryption key of the secured module, the decryption key corresponding to the encryption key;
   using the secured module to output an audible version of the audio content via a speaker of the client device;
   receiving the audible version of the audio content using a microphone of the client device;
   processing the audible version of the audio content received by the microphone so as to obtain the nonce; and
   providing the nonce as a response.

2. The challenge-response method of claim 1 wherein the nonce is encoded with an error correcting code, and the processing step further comprises decoding the error correction encoded nonce.

3. The challenge-response method claim 1 wherein the nonce is included in the audio content as a digital watermark.

4. The challenge-response method of any one of claim 1 wherein the nonce is included in the audio content using a modulation encoding technique.

5. The challenge-response method of 1 claim wherein the decryption key is unique to the secured module.

6. A client device comprising one or more processors for implementing a challenge-response method, the client device comprising:
   an input module for receiving challenge data, wherein the challenge data is audio content encrypted using an encryption key, the audio content including a nonce;
   a secured module arranged to access the audio content by decrypting the challenge data using a decryption key of the secured module, the decryption key corresponding to the encryption key;
   a speaker arranged to provide an audible version of the audio content output by the secured module; and
   a microphone arranged to receive the audible version of the audio content;
   a processor arranged to process the audible version of the audio content received by the microphone so as to obtain the nonce; and
   an output module arranged to provide the nonce as a response.

7. The client device of claim 6 wherein the nonce is encoded with an error correcting code, and wherein the processor comprises an error correction module arranged to decode the error correction encoded nonce.

8. The client device of claim 6 wherein the input module forms part of the secured module such that the secured module is itself operable to receive the challenge data.

9. One or more tangible and non-transitory computer readable media comprising computer program code which, when executed by a processor, causes the processor to carry out a challenge-response method for a client device, by:
   receiving challenge data, wherein the challenge data is audio content encrypted using an encryption key, the audio content including a nonce;
   using a secured module of the client device to access the audio content by decrypting the challenge data using a decryption key of the secured module, the decryption key corresponding to the encryption key;
   using the secured module to output an audible version of the audio content via a speaker of the client device;
   receiving the audible version of the audio content using a microphone of the client device;
   processing the audible version of the audio content received by the microphone so as to obtain the nonce; and
   providing the nonce as a response.

* * * * *